United States Patent
Moulins et al.

[11] Patent Number: 5,954,395
[45] Date of Patent: Sep. 21, 1999

[54] SEAT BACK WITH RE-ENTRANT REAR FACE

[75] Inventors: Frédéric Moulins, Clayes Sous Bois; Sylvain Lienasson, Saint Escobille, both of France

[73] Assignee: Bertrand Faure Equipment SA, Boulogne, France

[21] Appl. No.: 09/232,123

[22] Filed: Jan. 15, 1999

[30] Foreign Application Priority Data

Jan. 19, 1998 [FR] France ................................. 98 00500

[51] Int. Cl.⁶ ................................................. A47C 27/00
[52] U.S. Cl. .................................. 297/218.4; 297/218.5; 297/452.38; 297/452.59
[58] Field of Search .................. 297/218.1, 218.3, 297/218.4, 452.38, 452.59

[56] References Cited

U.S. PATENT DOCUMENTS

| | | |
|---|---|---|
| 3,801,154 | 4/1974 | Hultquist et al. . |
| 4,643,480 | 2/1987 | Morita ................................. 297/452.38 |
| 4,740,035 | 4/1988 | Kazaoka et al. ................. 297/218.3 X |
| 5,295,732 | 3/1994 | Boisset ................................. 297/452.1 |
| 5,478,134 | 12/1995 | Bernard et al. ................. 297/452.59 X |
| 5,503,454 | 4/1996 | Sakamoto . |

FOREIGN PATENT DOCUMENTS

| | | |
|---|---|---|
| 0 028 506 | 5/1981 | European Pat. Off. . |
| 2 674 485 | 2/1992 | France . |
| 2523343 | 12/1975 | Germany ........................... 297/452.38 |

*Primary Examiner*—Peter R. Brown
*Attorney, Agent, or Firm*—Marshall, O'Toole, Gerstein, Murray & Borun

[57] ABSTRACT

A motor vehicle seat includes a seat back which has a re-entrant rear face with a cavity closed by a sheet immobilized between two lateral uprights of the seat. Upholstery extends over the uprights and a cover covers the upholstery and is fixed into housings formed in the uprights. The sheet has lateral edges with hems into which two rods are inserted. The seat back structure includes arrangements for immobilizing the rods for fixing each of the rods into the housings and thereby to tension the sheet in the cavity, the cover being pressed into the housings by the rods.

9 Claims, 2 Drawing Sheets

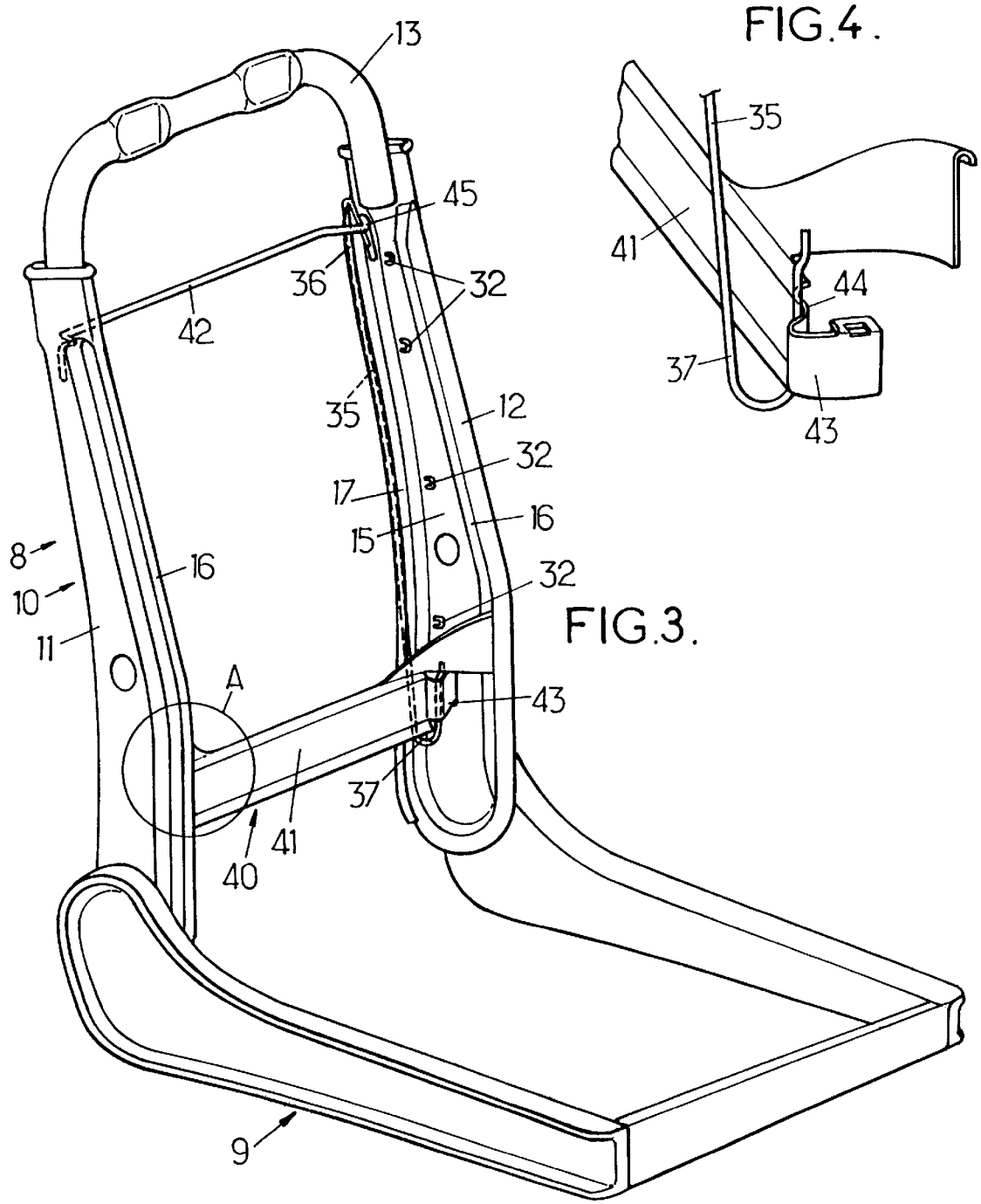

SEAT BACK WITH RE-ENTRANT REAR FACE

FIELD OF THE INVENTION

The present invention concerns a motor vehicle seat and in particular a seat which has a seat back with a re-entrant rear face.

BACKGROUND OF THE INVENTION

Document U.S. Pat. No. 5 295 732 describes a seat having a seat back which has:
- a front face facing towards the user;
- a rear face facing in the opposite direction to the front face and a portion of which is re-entrant to form a cavity in that rear face;
- a seat back structure comprising at least two lateral uprights;
- upholstery which extends across the front face of the seat and the lateral uprights;
- a cover covering the upholstery; and
- a sheet disposed in said cavity between the two lateral uprights.

This prior art has the drawback of dissociating the step of tensioning the cover over the upholstery from the step Of fitting the sheet into the cavity. This succession of steps is costly in terms of labor and requires a seat back structure of complex shape.

OBJECTS AND SUMMARY OF THE INVENTION

The aim of the invention is to remedy the above drawbacks by proposing a seat back in which the tensioning of the cover and the fitting of the sheet into the cavity are carried out in a single step without making the structure of the seat back more complex.

To this end, in a motor vehicle seat of the aforementioned type in accordance with the invention:
- the lateral uprights each comprise at least one web and one rim, the rim being bent to define with the web a housing, each web having an inside face facing towards the inside of the seat;
- the upholstery additionally extends over the webs and rims;
- the cover has two lateral edges, retaining means for the lateral edges being disposed on inside faces of the webs of the two uprights;
- the sheet has two lateral edges with hems into which two rods are threaded, the rods each having a top end and a bottom end; and
- the seat back structure further comprises means for immobilizing the top and bottom ends of the rods which fix each rod in the housing of the respective upright to stretch the sheet in cavity, substantially parallel to the rear face of the seat back, the cover extending over a part of the inside face of each web and over each rim, being pressed into the housings by the rods.

The seat in accordance with the invention can additionally have one or more of the following features:
- the webs of the lateral uprights extend towards the rear face of the seat back and the rim is substantially parallel to the web so that the housings are open towards the front face of the seat back;
- the lateral uprights each comprise a lateral flange which includes a web and front and rear rims bent towards the interior of the seat and facing each other;
- the lateral uprights each comprise a tube to which is attached a web that extends towards the rear of the seat and which has a rim bent towards the front of the seat;
- the retaining means for the lateral edges of the cover comprise hooks facing towards the front face of the seat;
- the immobilizing means comprise a bottom crosspiece connecting the lateral uprights and which has two ends, each of the ends comprising a recess substantially facing each of the housings and in which the bottom end of each of the rods engages;
- the immobilizing means further comprise a top wire fixed to the lateral uprights and on which the top ends of the rods abut;
- the rods are elastically flexible in the direction towards the rear face of the seat; and
- the bottom end of each rod is curved towards the front of the seat in order to engage elastically in the corresponding housing.

BRIEF DESCRIPTION OF THE DRAWINGS

Two embodiments of the invention will now be described with reference to the accompanying drawings, in which:

FIG. 3 is a general view of the structure of the seat shown in FIG. 1;

FIG. 4 is a view to a larger scale of a part A of the structure of the seat back shown in FIG. 3.

MORE DETAILED DESCRIPTION

Figure 1:
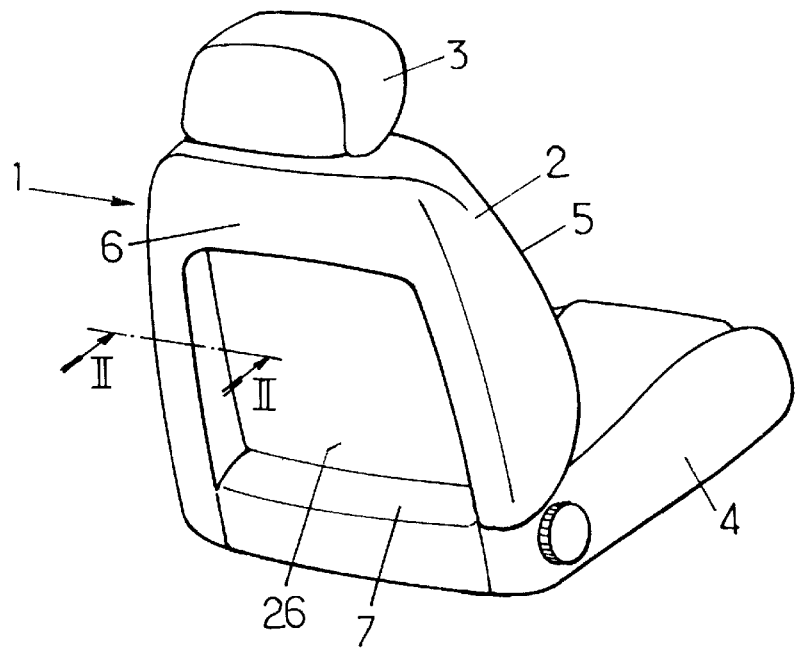
FIG. 1 is a rear perspective view of a seat having a seat back with a re-entrant rear face in accordance with the present invention.

The seat 1 shown in FIG. 1 comprises, in a manner known in itself, a seat back 2 surmounted by a headrest 3 and which is attached, for example rotatably attached, to a seat cushion 4.

The seat back 2 has a front face 5 facing towards a person seated in the seat and a rear face 6 facing in the opposite direction to the front face 5.

Part of the rear face 6 is re-entrant, in other words a cavity 7 occupies the major part of the rear face 6. The cavity 7 is intended to provide the maximum space for the knees of the rear seat passengers in a motor vehicle to which the seat 1 is fitted. The cavity is rectangular or square, for example.

Figure 2:
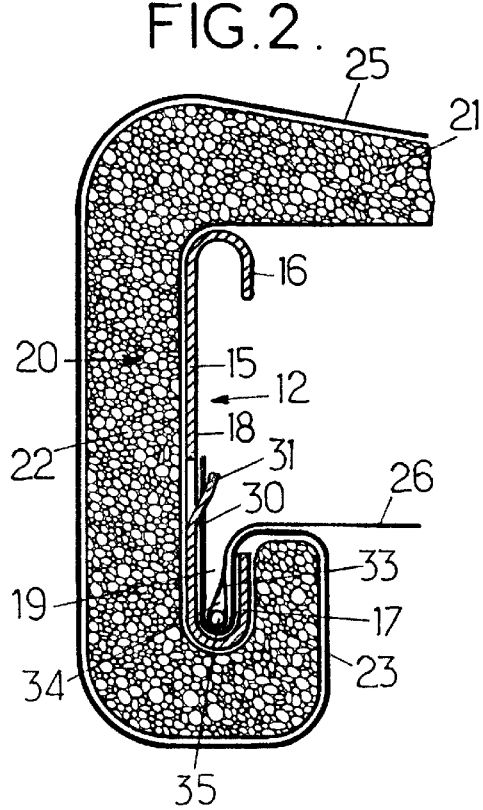
FIG. 2 is a view in cross-section taken along the line II—II in FIG. 1.

FIGS. 2 and 3 show more particularly that the seat back 2 has a seat back structure 8 and the seat cushion 4 has a seat cushion structure 9 on which the seat back structure 8 is mounted. The structure 8 is of inverted U shape and comprises two lateral uprights 10 taking the form of two lateral flanges 11 and 12 which are surmounted by a tube 13 designed to support the headrest 3.

Each of the lateral flanges 11 and 12 has a web 15 parallel to the longitudinal direction of the seat and front and rear rims 16 and 17. The web 15 and the front and rear rims 16 and 17 of each of the flanges are pressed in one piece, the rims being curved towards the interior of the seat and facing each other. The rims are therefore parallel to the longitudinal direction of the seat and the rear rim 17 has a width corresponding to a fraction of the depth of the cavity 7 so that a U-shape cross-section housing 19 is formed between the web 15 and the rear rim 17 of each flange 11, 12.

The seat back 2 further comprises upholstery 20 made of resilient foam, for example. The upholstery 20 has a main part 21 extending across the front face 5 of the seat back 2 with two integral side-pieces 22 that cover the webs 15 of the flanges 11 and 12, lips 23 integral with the side-pieces 22 covering the rear rim 17 of each of the flanges.

The lips 23 on the upholstery 20 are twice the width of the rear rims 17, for example, this width substantially corresponding to the depth of the cavity 7 formed on the rear face 6 of the seat back 2 of the seat 1.

A protective cover 25 made of fabric, leather or a plastics material, for example, covers the surface of the upholstery 20 and a sheet 26 extends between the two flanges 11 and 12 to cover the back of the cavity 7. Fitting the cover 25 and the sheet 26 will now be described with reference to FIGS. 2 to 4.

The cover 25 has two free lateral edges 30 which are on the inside faces 18 of the webs 15 of the flanges 11 and 12 when an operative has covered the upholstery 20 with the cover 25. Retaining means 31 are regularly distributed along the height of the webs 15 of each of the flanges 11 and 12. The retaining means 31 are hooks or spikes 32 in one piece with the flanges and facing towards the front face 5 of the seat.

The dimensions of the cover 25 are such that it covers the main part 21, the side-pieces 22 and the lips 23 of the upholstery 20 and the surface of the housing 19 when the lateral edges 30 of the cover are hooked onto the spikes 32.

The sheet 26 also has two lateral edges 33 forming hems 34 adapted to locate in the housings 19 on either side of the cavity 7. The sheet 26 therefore has dimensions substantially equal to those of the cavity 7.

Two rods 35 are threaded into the hems 34. The length of each rod 35 is slightly less than the height of the two flanges 11 and 12 so that it can fit in the housings 19 and each rod has a top end 36 and a bottom end 37.

The seat back structure 8 has means 40 for immobilizing the top and bottom ends 36 and 37 of the rods 35 for fixing the rods 35 into the housings 19.

The immobilizing means 40 consist in a bottom crosspiece 41 and a top wire 42 both of which are disposed between the flanges 11 and 12. The crosspiece 41 and the wire 42 are routinely found in seat back structures where they stiffen and support the upholstery or to be more precise the resilient sheet supporting the upholstery.

In accordance with the present invention the bottom crosspiece 41 has two ends 43 respectively adapted to be welded to the webs 15 of the flanges 11 and 12 so that the plane of the crosspiece 41 is substantially perpendicular to that defined by the webs 15.

As shown more precisely in FIG. 4, each end 3 has an undulating shape forming a recess 44 adapted to face the housing 19. The bottom end 37 of each rod 35 is curved towards the front of the seat to engage inside the housing 44.

The ends of the top wire 42 are bent to form a support 45 facing the housing 19 to immobilize the top ends 36 of the rods 35.

To fit the cover 25 over the upholstery 20 and the sheet 26 into the cavity 7 all that is required is to immobilize the lateral edges 30 of the cover 25 on the spikes 32 and then to insert each rod 35 into each housing 19 with the top ends 36 of the rods engaged in the supports 45 of the top wire 42. The curved bottom ends 37 are parallel to the crosspiece 41 at this time. The operative must then rotate each rod 35 until the ends 37 engage in the housings 44 of the crosspiece 41.

During this operation the cover espouses the shape of the housing 19, being sandwiched between the housing and the rod 35.

This tensions the cover 25 over the upholstery 20 and positions the web 26 in the cavity 7 in one operation.

Each rod 35 is elastically flexible in the direction towards the rear face 6 of the seat back so as to improve further the holding of the rod in position in its housing 19.

In a variant the abutment for the top end 36 of the rod 35 can be a cone fixed to each lateral flange 11 and 12 above the housing 19.

Figure 5:
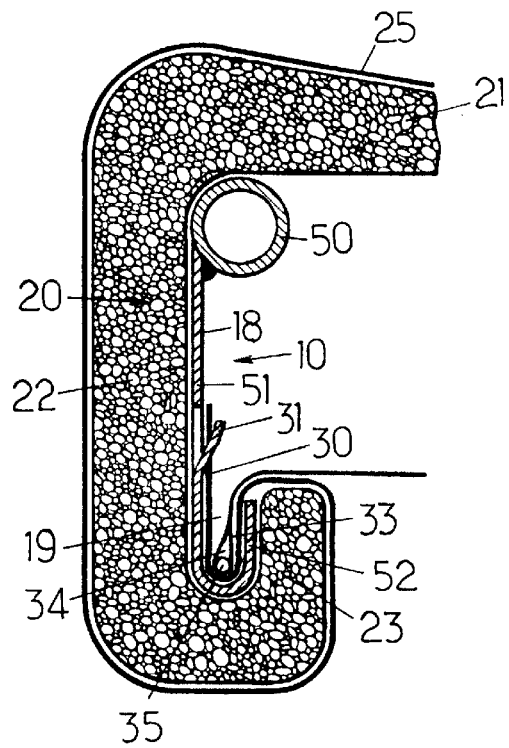
FIG. 5 is a view in cross-section of a second embodiment of a seat back in accordance with the present invention.

The second embodiment shown in FIG. 5 differs from the first embodiment previously described only in that the lateral uprights 10 of the seat back 2 are no longer formed by flanges but by tubes 50 to each of which is welded a web 51 that extends towards the rear face 6 of the seat and which has a rim 52 bent towards the front face 5 of the seat. The other components of the seat back in accordance with the present invention are identical and carry the same reference numbers as previously.

We claim:

1. A motor vehicle seat comprising at least one seat back which includes:
   a front face facing towards the user;
   a rear face facing in the opposite direction to the front face and a portion of which is re-entrant to form a cavity in that rear face;
   a seat back structure comprising at least two lateral uprights;
   upholstery which extends across the front face of the seat and the lateral uprights;
   a cover covering the upholstery; and
   a sheet disposed in said cavity between the two lateral uprights,
   wherein:
   said lateral uprights each comprise at least one web and one rim, said rim being bent to define with said web a housing, each web having an inside face facing towards the inside of said seat;
   said upholstery additionally extends over said webs and said rims;
   said cover has two lateral edges, retaining means for said lateral edges being disposed on inside faces of said webs of said two uprights;
   said sheet has two lateral edges with hems into which two rods are threaded, said rods each having a top end and a bottom end; and
   the seat back structure further comprises means for immobilizing said top and bottom ends of said two rods which fix each rod in said housing of the respective upright to stretch said sheet in said cavity, substantially parallel to said rear face of said seat back, said cover extending over a part of said inside face of each web and over each rim, being pressed into said housings by said rods.

2. A motor vehicle seat as claimed in claim 1 wherein said webs of said lateral uprights extend towards said rear face of said seat back and said rim is substantially parallel to said web so that said housings are open towards said front face of said seat back.

3. A motor vehicle seat as claimed in claim 1 wherein said lateral uprights each comprise a lateral flange which includes a web and front and rear rims bent towards the interior of said seat and facing each other.

4. A motor vehicle seat according to claim 1 wherein said lateral uprights each comprise a tube to which is attached a web that extends towards the rear of said seat and which has a rim bent towards the front of said seat.

5. A motor vehicle seat according to claim 1 wherein said retaining means for said lateral edges of said cover comprise hooks facing towards said front face of said seat.

6. A motor vehicle seat according to claim 1 wherein said immobilizing means comprise a bottom crosspiece connecting said lateral uprights and which has two ends, each of said ends comprising a recess substantially facing each of said housings and in which said bottom end of each of said rods engages.

7. A motor vehicle seat according to claim 6 wherein said immobilizing means further comprise a top wire fixed to said lateral uprights and on which said top ends of said rods abut.

8. A motor vehicle seat according to claim 1 wherein said rods are elastically flexible in the direction towards said rear face of said seat.

9. A motor vehicle seat according to claim 8 wherein said bottom end of each rod is curved towards the front of said seat in order to engage elastically in the corresponding housing.

* * * * *